Figure 1:
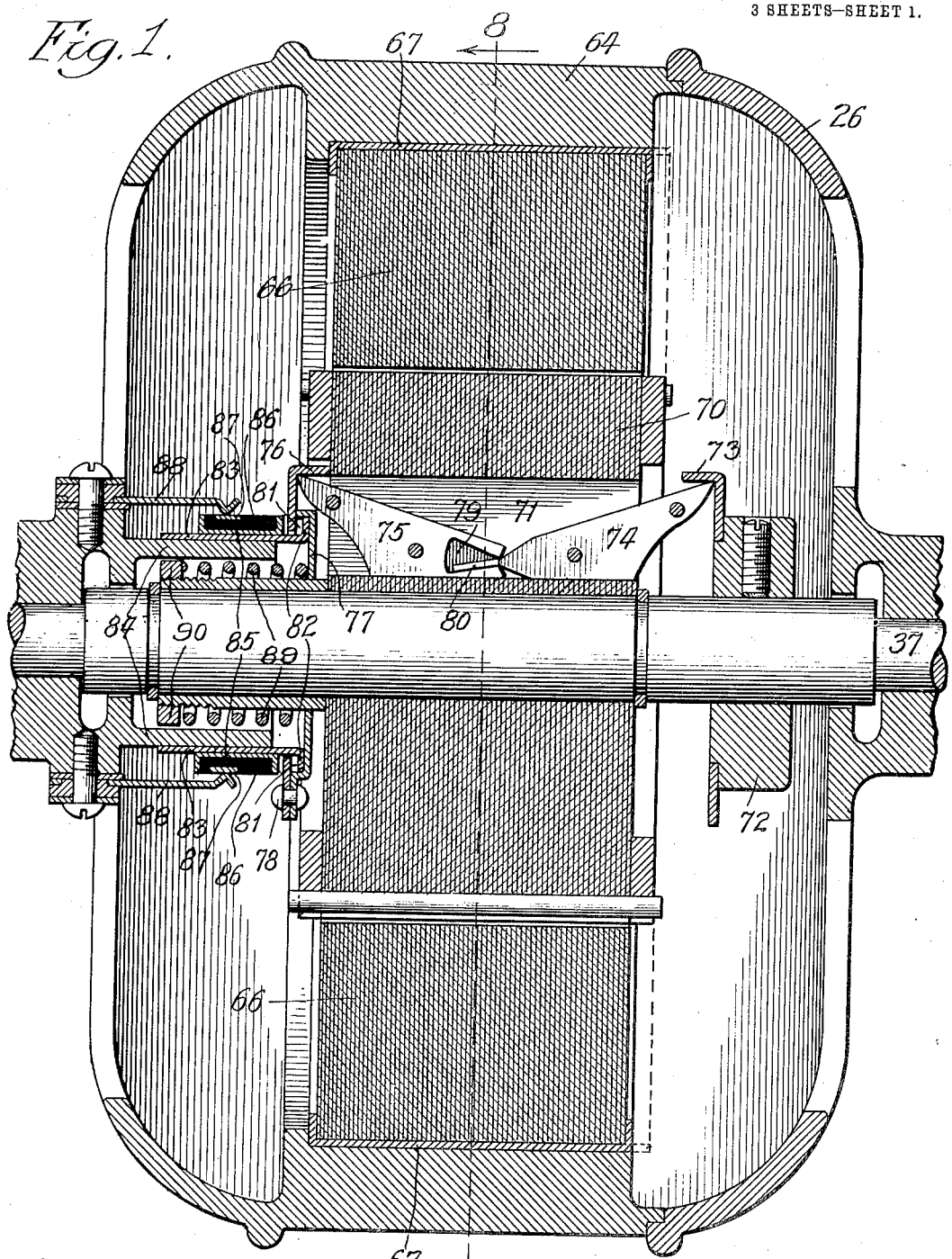

E. S. PILLSBURY.
ELECTRIC MOTOR.
APPLICATION FILED APR. 11, 1911.

1,093,074.

Patented Apr. 14, 1914.

3 SHEETS—SHEET 1.

Witnesses:
John Enders
Henry A. Parks

Inventor:
Edwin S. Pillsbury,
by Sheridan, Wilkinson, Scott & Richmond
Attys.

E. S. PILLSBURY.
ELECTRIC MOTOR.
APPLICATION FILED APR. 11, 1911.
1,093,074.
Patented Apr. 14, 1914.
3 SHEETS—SHEET 2.
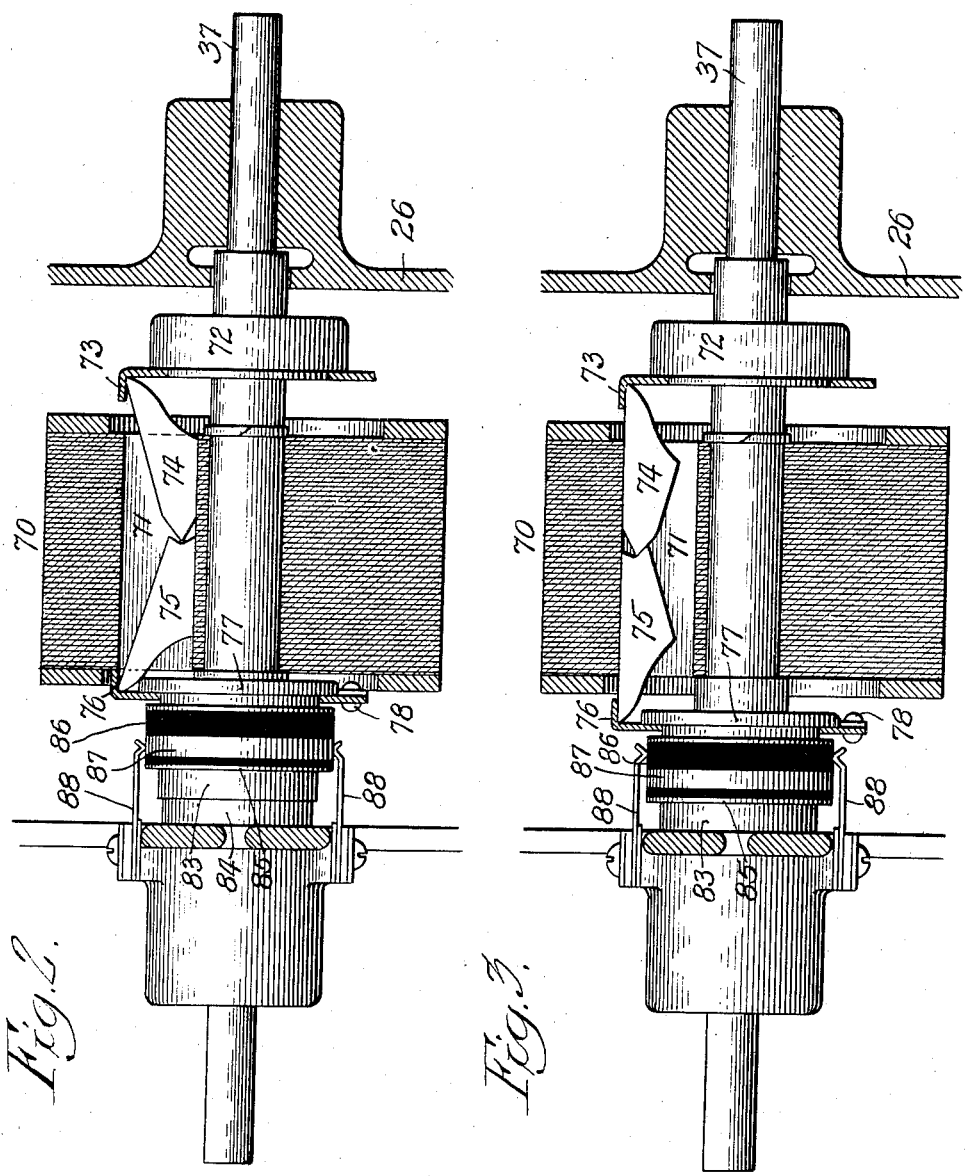

E. S. PILLSBURY.
ELECTRIC MOTOR.
APPLICATION FILED APR. 11, 1911.
1,093,074.
Patented Apr. 14, 1914.
3 SHEETS—SHEET 3.
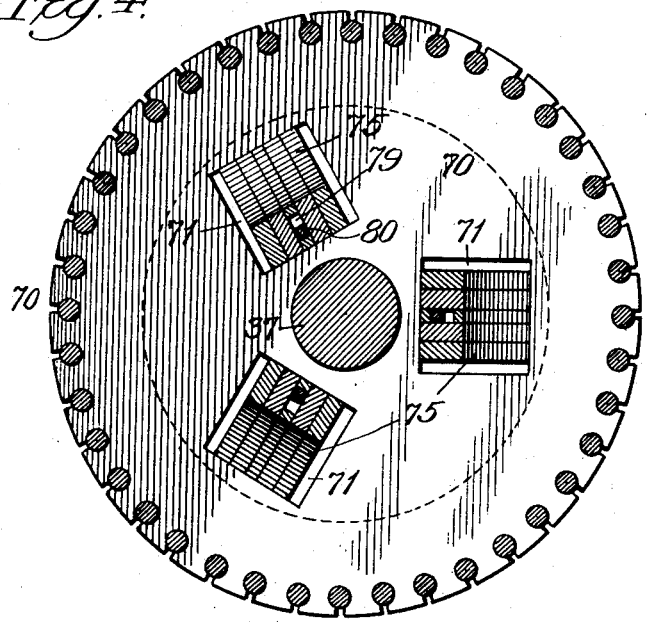
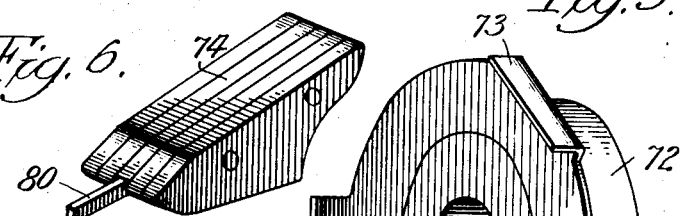
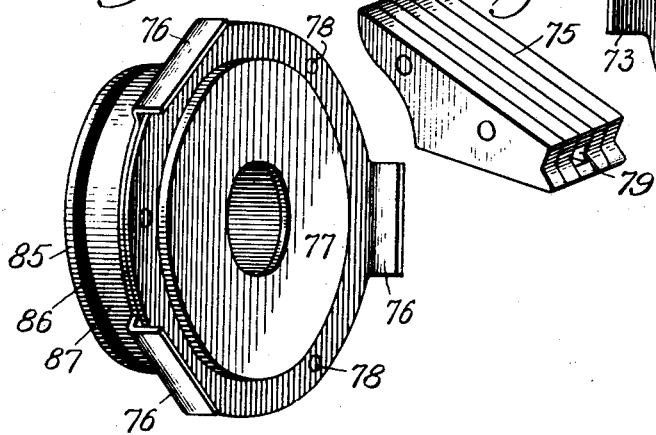
Witnesses:
John Enders
Henry A. Parks
Inventor:
Edwin S. Pillsbury,
by Sheridan, Wilkinson, Scott & Richmond,
Attys.

UNITED STATES PATENT OFFICE.

EDWIN S. PILLSBURY, OF ST. LOUIS, MISSOURI, ASSIGNOR TO CENTURY ELECTRIC COMPANY, A CORPORATION OF MISSOURI.

ELECTRIC MOTOR.

1,093,074. Specification of Letters Patent. Patented Apr. 14, 1914.

Application filed April 11, 1911. Serial No. 620,350.

*To all whom it may concern:*

Be it known that I, EDWIN S. PILLSBURY, a citizen of the United States, residing at St. Louis, in the State of Missouri, have invented certain new and useful Improvements in Electric Motors, of which the following is a specification.

The principal object of my invention is to provide a new and improved motor suitable for driving a fan.

Another object of my invention is to provide a new and improved centrifugal mechanism by which the circuit connections of an electric motor may be changed after it has attained a certain speed.

All these objects and others will be made apparent in the following specification and claims, when taken in connection with the accompanying drawings.

For the purpose of illustrating and explaining the principles involved in my invention I have shown a specific embodiment thereof in the drawings filed herewith, and I now proceed to describe the same.

Figure 1 is a horizontal section of the motor. Figs. 2 and 3 are horizontal sections of the motor armature, showing the centrifugal mechanism at starting and at speed, respectively. Fig. 4 is a cross section of the armature, taken on the line 4 of Fig. 1. Figs. 5, 6, 7 and 8 are perspective views of elements of the centrifugal mechanism.

The motor frame or stator frame consists of the main part 64 with an integral end plate on one side and a removable end plate 26 on the other side, these end plates carrying the bearings for the rotor shaft.

The armature 70 is of ordinary squirrel cage type. Spaced equiangularly around its axis are three rectangular slots 71 extending parallel to the axis. A fixed abutment 72 is clamped on the armature shaft at one end, and this carries a spider with three lugs 73 opposite the respective slots 71. Within each slot 71 there is a toggle mechanism comprising the two members 74 and 75 engaging one another by a knife edge and groove joint, the member 74 having its extreme end pivoted under the fixed lug 73 and the member 75 having its extreme end pivoted under the lug 76 on a collar which surrounds the armature shaft. The members 74 and 75 are built up from punchings of sheet metal riveted together. The middle punching of 74 carries an extension tongue 80 and the corresponding punching of 75 is slotted, as indicated by 79, to receive the tongue 80. The ring that carries the lugs 76 is secured by rivets 78 to another ring 77 that fits closely around the armature shaft 37, and these two rings are so shaped and united as to have an inside groove 81 between them. A sliding sleeve 83 has its end formed as a flange 82 which fits within this groove 81. The end plate of the motor has an annular boss 84 cast integral therewith which surrounds the armature shaft and upon which the sleeve 83 is mounted. This sliding sleeve 83 carries a channel ring 85, filled with insulating material 86, and within this insulating material is embedded a metal ring 87. Brushes 88 are secured by insulating supports to the end plate of the motor, and their extremities rest upon the metal ring 87 or upon the insulating material 86 adjacent thereto. [Compare Figs. 2 and 3]. A helical spring 89 acts between the ring plate 77 and the nut 90, which latter constitutes an abutment fixed on the armature shaft 37; thus the spring 89 tends to hold the parts in the position shown in Figs. 1 and 2.

It will be readily understood that when a certain speed has been attained by the rotating armature, the centrifugal force acting on the toggle members 74 and 75 will throw them out to the position shown in Fig. 3, thus pushing the ring 76—77 against the spring 89 and shifting the sleeve 85 to the left. When the speed of the motor is reduced again, the force of the spring 89 will throw the toggle members down from the position shown in Fig. 3 to that shown in Fig. 2.

I claim:

1. In an electric motor, a shaft, a rotor thereon, said rotor comprising a plurality of annular laminæ and having a slot through said laminæ eccentric to the shaft, an electric conductor for said motor comprising a displacement element, means automatically to displace said element at a certain speed comprising toggle mechanism within the said eccentric slot, an abutment fixed relatively to the rotor to which one member of the toggle mechanism is pivoted, and a sliding abutment on the rotor shaft to which the other member of the toggle mechanism is pivoted, said sliding abutment being connected to said displaceable element.

2. In an electric motor, a shaft, a rotor thereon, said rotor having a plurality of equally spaced slots around its axis, an electric conductor for said motor, means automatically to change the continuity of said conductor at a certain speed comprising two heavy toggle members in each slot, an abutment fixed relatively to the rotor for one of each pair of toggle members, a sliding abutment for the other member of each pair, said toggle members lying entirely between said abutments and adapted to push said abutments apart when acted upon by centrifugal force, and a member comprised in said electric conductor and operated by said sliding abutment to change the continuity of the same.

3. In an electric motor, a rotor shaft, a conductor for the motor, a centrifugal device to change the conductor at a certain speed comprising a fixed abutment on the rotor shaft, a sliding abutment on the rotor shaft, a spring adapted to push the sliding abutment toward the fixed abutment, and a pair of toggle members acting between the two abutments, said toggle members being weighted and the entire weight thereof lying between the two abutments.

4. In an electric motor, a rotor, a rotor shaft, an end plate, a conductor for the motor, means automatically to change the conductor at a certain speed comprising an annular boss projecting beyond the rotor from the end plate of the motor and surrounding the rotor shaft, an insulated ring slidably mounted on said boss, two contact terminals adapted to rest on said ring and be electrically connected thereby, said ring and terminals being comprised in said conductor, and centrifugal mechanism carried by the rotor to displace said ring in an axial direction.

5. In an electric motor, a rotor, a rotor shaft, an end plate, a conductor for the motor, and means automatically to change the relation of the parts of the conductor at a certain speed comprising an annular boss projecting toward the rotor from the end plate of the motor and surrounding the rotor shaft, a sliding sleeve on said boss having an outwardly turned flange on the end thereof toward the rotor, a collar having an inwardly directed groove engaging said flange, said collar being mounted to rotate with the rotor, an insulated metal ring carried by said sliding sleeve, contact terminals resting on said ring, and centrifugal mechanism engaging the said collar and adapted to displace the same.

6. In an electric motor, an armature having holes therein parallel with the axis and spaced equidistantly around the axis, toggle joint members within said holes, each said member comprising sheet metal punchings laid side by side and riveted together, and contact changing elements adapted to be displaced by said toggle joint members.

7. In an electric motor, a shaft, an armature thereon, a fixed spider on the shaft at one end of the armature, a sliding spider on the shaft at the other end of the armature, said armature having an eccentric slot therethrough, and toggle joint members within the slot, the extreme ends thereof engaging the respective spiders, and the intermediate ends engaging one another by a knife edge and groove joint.

8. In an electric motor, a shaft, an armature thereon, a fixed spider on the shaft at one end of the armature, a sliding spider on the shaft at the other end of the armature, said armature having an eccentric slot therethrough, and toggle joint members within the slot, the extreme ends thereof engaging the respective spiders, and the intermediate ends engaging one another by a knife edge and groove joint, the knife edge member having a projecting tongue and the groove member having a slot to receive said tongue.

9. In an electric motor, a shaft, an armature thereon, a fixed spider on the shaft at one end of the armature, a sliding spider on the shaft at the other end of the armature, said armature having an eccentric slot therethrough, and toggle joint members within the slot, the extreme ends thereof engaging the respective spiders, and the intermediate ends engaging one another by a knife edge and groove joint, the toggle members being built up of sheet metal punchings riveted together, the intermediate punching of the knife edge member having a projecting tongue and the corresponding punching of the groove member having a slot to receive said tongue.

10. In an electric motor, a rotor, a rotor shaft, said rotor having an eccentric slot therein, a conductor for the motor, means automatically to change the conductor at a certain speed comprising a centrifugal weight within said eccentric slot in the rotor, an abutment fixed relatively to the rotor, another abutment slidably mounted on the rotor shaft, an electric contact member comprised in said conductor and controlled by said sliding abutment, and connections from the said centrifugal weight to the said two abutments.

11. In an electric motor, a rotor, a rotor shaft, said rotor having an eccentric slot therein, a conductor for the motor, means automatically to change the conductor at a certain speed comprising a centrifugal weight within said eccentric slot in the rotor, an abutment fixed relatively to the rotor, another abutment slidably mounted on the rotor shaft, an electric contact member comprised in said conductor and controlled by said sliding abutment, and means connecting the said centrifugal weight to the said abutments, said means being adapted to transmit the centrifugal force of the centrifugal weight to the said abutments with increasing effectiveness as said weight moves out radially.

12. In an electric motor, a rotor, a rotor shaft, an end plate, a conductor for the motor, means automatically to change the conductor at a certain speed comprising an insulated ring around the rotor shaft within said end plate, said ring forming part of said conductor, supporting and guiding means for said ring carried by the said end plate adapted to permit the latter to slide longitudinally with respect to the rotor shaft, two contact terminals adapted to rest on said ring and be electrically connected thereby, and centrifugal mechanism carried by the rotor to displace said ring in an axial direction.

In testimony whereof, I have subscribed my name.

EDWIN S. PILLSBURY.

Witnesses:
J. RUSSELL,
JOHN HERGIT.

---

It is hereby certified that in Letters Patent No. 1,093,074, granted April 14, 1914, upon the application of Edwin S. Pillsbury, of St. Louis, Missouri, for an improvement in "Electric Motors," an error appears in the printed specification requiring correction as follows: Page 1, line 101, for the word "displacement" read *displaceable;* and that the said Letters Patent should be read with this correction therein that the same may conform to the record of the case in the Patent Office.

Signed and sealed this 12th day of May, A. D., 1914.

[SEAL.]

J. T. NEWTON,

*Acting Commissioner of Patents.*